United States Patent
Skinner

[19]

[11] Patent Number: 5,970,654
[45] Date of Patent: Oct. 26, 1999

[54] METHOD OF AQUAFYING A FLOWER ARRANGEMENT

[76] Inventor: George A. Skinner, 892 Oro Grande, Oceanside, Calif. 92057

[21] Appl. No.: 08/926,697

[22] Filed: Sep. 10, 1997

[51] Int. Cl.$^6$ ...................................................... A47G 7/00
[52] U.S. Cl. ............................................................. 47/41.01
[58] Field of Search ............................... 47/41.01, 41.12, 47/41.13

[56] References Cited

U.S. PATENT DOCUMENTS

| | | | |
|---|---|---|---|
| 2,965,584 | 12/1960 | Elkin | 47/41.13 |
| 3,310,912 | 3/1967 | Melander | 47/41.12 |
| 3,826,041 | 7/1974 | King | 47/41.12 |
| 4,044,502 | 8/1977 | Hillenbrand | 47/41.12 |
| 4,941,572 | 7/1990 | Harris | 47/41.12 X |
| 5,103,586 | 4/1992 | Farrell | 47/41.12 |
| 5,402,599 | 4/1995 | Weder et al. | 47/41.12 |
| 5,469,654 | 11/1995 | Thompson | 47/41.12 |

FOREIGN PATENT DOCUMENTS

| | | | |
|---|---|---|---|
| 3042429 | 5/1982 | Germany | 47/41.12 |

*Primary Examiner*—Robert P. Swiatek
*Assistant Examiner*—Elizabeth Shaw
*Attorney, Agent, or Firm*—John J. Murphey

[57] ABSTRACT

A method of aquafying a potted flower arrangement comprising the steps of providing an open-top receptacle for holding the stems of flowers set in an arrangement; charging a measured quantity of foamable liquid ingredients into the receptacle, the quantity being sufficient to generate a foam that will fill at least a portion of the receptacle; injecting a quantity of water, under pressure, down into the generated foam inside the receptacle; and, inserting the stems of the flowers making up the arrangement into the foam and down into the injected water contained therein.

10 Claims, 2 Drawing Sheets

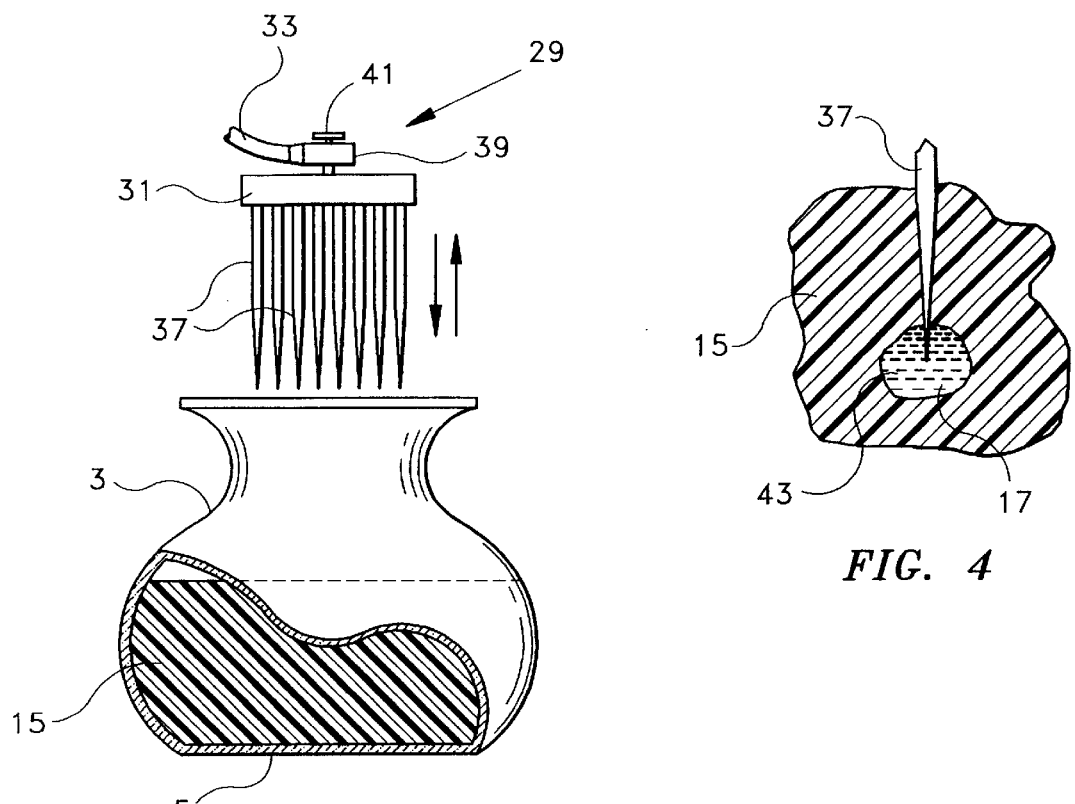
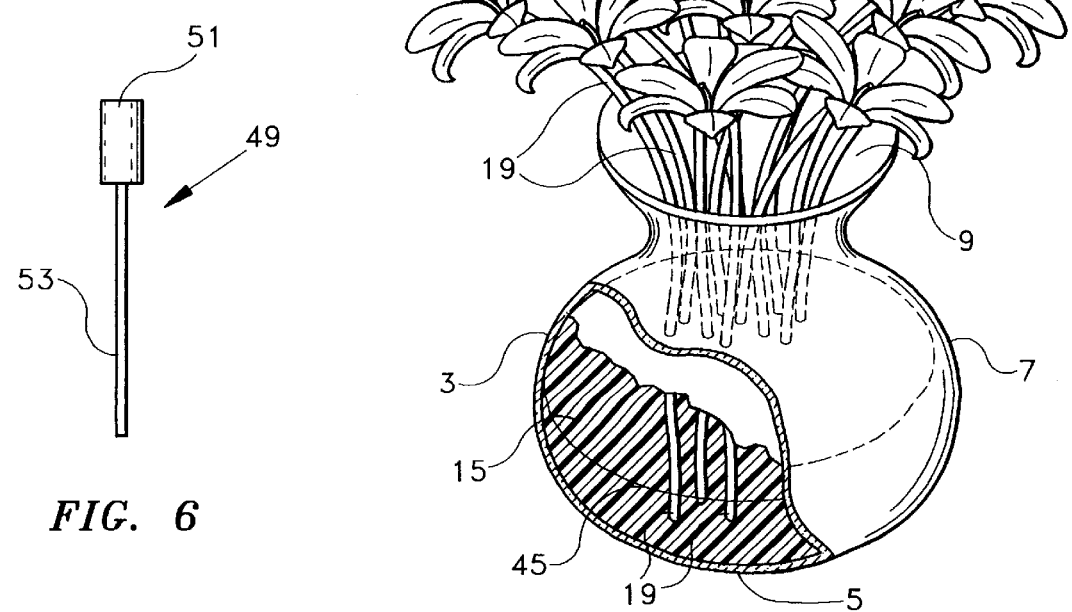

5,970,654

METHOD OF AQUAFYING A FLOWER ARRANGEMENT

BACKGROUND OF THE INVENTION

1. Field of the Invention

This invention pertains to the field of flower displays. More particularly, it pertains to the field of potted flower arrangements and to an improved method of making a live flower arrangement with internal watering using less labor and less time than is required in the prior art practice.

2. Description of the Prior Art

When daisies pied and violets blue
   And lady-smocks all silver-white
And cuckoo-buds of yellow hue
   Do paint the meadows with delight
      Shakespeare: Love's Labour's Lost, Vii This 1594 passage, by one of the world's greatest playwrights, mirrors the message of flowers to all the world. Flowers and their arrangements are a delight for persons of all ages and bring happiness to all who receive them and can view their beauty. Florists have flourished for centuries, selling flowers and flower arrangements to customers, as gifts to cover a variety of occasions, to express their love, joy, sorrow and comfort.

In the field of flower arrangements, i.e., flowers arranged in a fanciful pattern in a receptacle, there are presently two general types: fresh flowers and silk or synthetic flowers. Silk flower arrangements are usually mounted in a plug of foam located inside the receptacle. These flowers require no particular servicing, other than the occasional dusting.

However, with respect to fresh flowers, far more effort is required in arranging them and later servicing them. It is to this part of the flower industry that this invention is directed.

Arranged fresh flowers require two things: a mounting medium and water. If the mounting medium is removed, the flowers fall out of arrangement and the fancifulness of the arrangement is spoiled. If water is not provided, at the time the arrangement is made and thereafter, the flowers will wilt and lose their luster and beauty so that they no longer convey the good tidings and/or care that is commensurate with the arrangement.

Presently, in potted fresh flower arrangements, the current practice is to provide a block of reticulated plastic formaldehyde foam that is cut into plugs, saturated with water, and then placed in an open-top receptacle. The wet foam can either be anchored in the receptacle with a weight, such as a small amount of lead, or it can be glued or otherwise adhered to the inside surface of the receptacle. However, because it is saturated with water at this point in time, anchoring it can be a problem.

The step of soaking the plug in water usually takes two or more hours, depending upon the size and shape of the plug, and requires a large container in which to place the many pieces of the foam and cover them with water. The cutting of water-saturated foam is messy and often creates a dirty and possibly hazardous work place, especially if an electric saw or knife is used to cut the foam. In addition, because the inside of many receptacles are not square, there is the matter of cutting the plug to fit. This results in much waste of foam and water. In today's practices of a clean working environment, such a mess may run afoul of anti-pollution laws and the like.

The foam of choice in present practice is a plastic formaldehyde foam sold under the trademark "OASIS®". It is a semi-rigid foam, meaning that it forms a rather stiff foam that holds the stems of the flowers in place after the arrangement is made. Often, a narrow-diameter stick is inserted down into the foam plug from the top to locate holes in which the stems of fresh flowers may later be inserted.

Accordingly, under current practice, a large block of reticulated, semi-rigid polyurethane foam is cut into plugs, placed in a large container and covered with water for two to four hours in order to allow the water to permeate the interconnected cells and saturate the foam. Then, small water-saturated plugs are inserted into the receptacle through its open top. Holes are then formed in the foam with a narrow diameter plunger and the stems of fresh flowers are inserted therein to make the arrangement.

Because the foam is totally saturated, there is always the possibility that some water will spill out of the open top of the receptacle and mess the wrapping paper. Such water saturation is not needed throughout the entire plug of foam. Only the bottom of the foam plug in the receptacle needs to hold water as the flower stem is cut on the bottom and draws water up into the flower from the bottom. The time and mess created in cutting the foam into plugs, soaking the plugs in water and then fitting the plugs into the receptacles constitutes a waste of water, time and foam that drives up the cost of making a fresh flower arrangement in a receptacle.

SUMMARY OF THE INVENTION

This invention is an improved method of making a fresh flower arrangement in an open-top receptacle. It uses foam that is formed in situ in the receptacle and then charged with water just before the fresh flowers are arranged therein. The term "aquafying" is used by the inventor to delineate the charging of water into the foam under pressure rather than saturating an entire block of foam by soaking for hours.

By this unique method, the time-consuming steps of cutting the foam into plugs, soaking the plugs in water and the mess created in stuffing the water-saturated plugs into the receptacles are totally eliminated. The result is a better fresh flower arrangement, made in less time, using less foam and eliminating the waste of foam, using less labor and accomplished with a shorter amount of handling to reduce the overall cost of producing the arrangement. In addition, the amount of water used is less and there is no need to soak the foam plugs in a large volume of water, thereby saving this valuable resource.

By this invention, a product may be produced that constitutes a midway point between obtaining the receptacle and making the flower arrangement. Because the foam is not saturated with water when the foam is placed in the receptacle, a product may be manufactured consisting of the receptacle and the foam already located inside the receptacle and totally dry. This product may then be sold to flower arrangers who can inject water into the foam as they wish and then make the fresh flower arrangement. The injected water may be mixed with preservatives and/or fertilizers to enhance the flower arrangement. The flower arrangers may alternatively decide to use the dry foam/receptacle combination in a silk flower arrangement. Using this novel method one product is made that fulfills the needs for two end products.

The unique method of this invention includes the steps of: providing an open-top receptacle for holding the stems of flowers set in an arrangement; charging a measured quantity of foamable liquid ingredients into the receptacle where the quantity is sufficient to generate a foam in situ that will fill at least a portion of the receptacle; injecting a quantity of water, either alone or containing preservatives and fertilizers, under pressure, down into the bottom of the generated foam inside the receptacle; and, inserting the stems of the flowers making up the arrangement into the foam and down into the injected water contained therein.

Accordingly, the main object of this invention is an improved method of making and aquafying a fresh flower arrangement. Other objects include a method that saves time and materials in the manufacture of fresh flower arrangements; a method that utilizes fewer steps and fewer people in the manufacturing line thereby saving costs of manufacture; a method that does away with the old-fashion soaking of a large number of foam plugs so as to reduce the area and floor space needed to produce the fresh flower arrangement; a method of producing an intermediary product that may be used to make silk or fresh flower arrangements; and, a method that improves the entire manufacturing plant by reducing the costly use of water and reducing and/or eliminating the waste of polyurethane foam and the pollution it causes when discarded at a land fill.

These and other objects of the invention may be determined by reading the description of the preferred embodiments along with the drawings attached hereto. The scope of protection sought by the inventor may be gleaned from a fair reading of the claims that conclude this specification.

DESCRIPTION OF THE DRAWINGS

FIG. 3 is a view similar to that of FIG. 2, showing the next steps in the novel method of this invention and the foam produced in situ;

FIG. 4 is a close-up view of a portion of the foam used in this invention near the bottom of the foam in the receptacle;

FIG. 5 is a perspective view, partially in section of the product produced by the novel method of this invention; and, FIG. 6 is a side view of a typical punch used in this invention.

DESCRIPTION OF THE PREFERRED EMBODIMENTS

Figure 1:
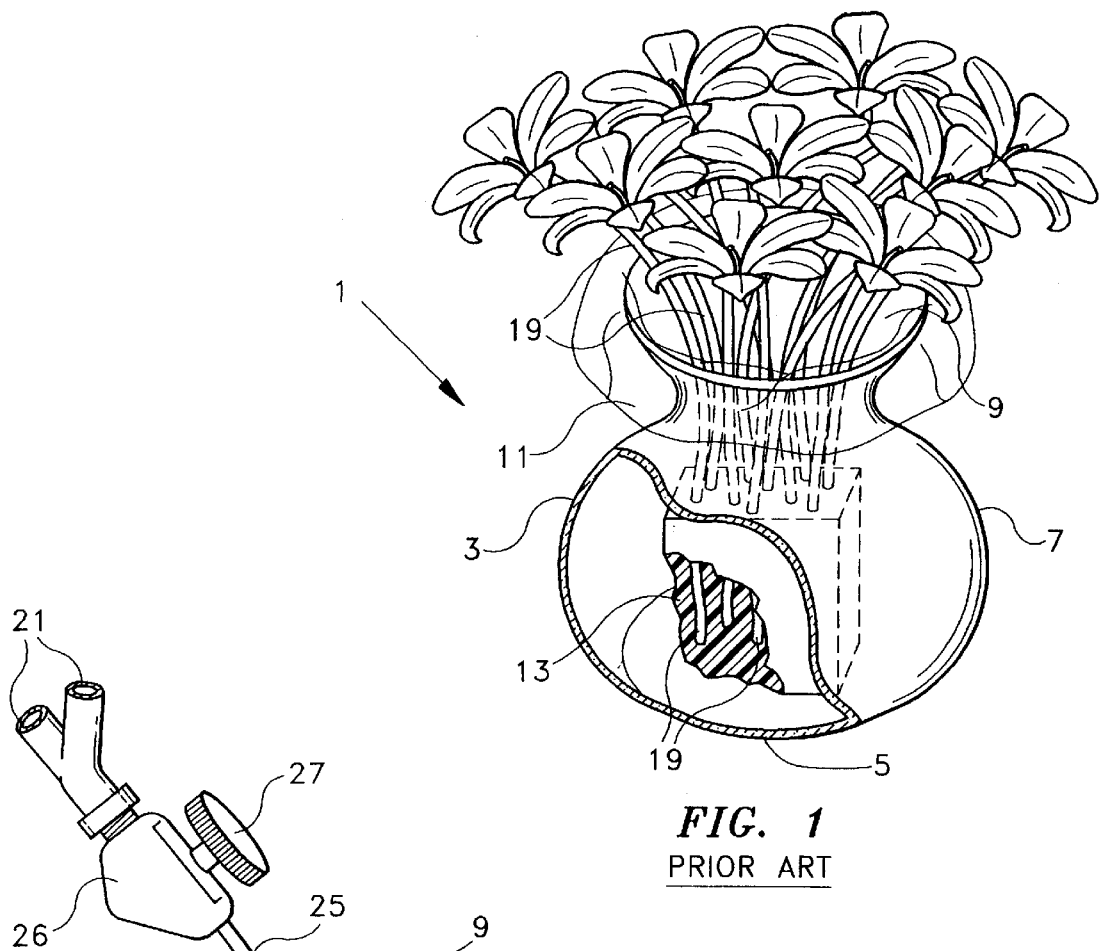
FIG. 1 is a perspective view, partially in section, of a flower arrangement of the prior art.

Turning now to the drawings where elements are identified by numbers and like elements are identified by like numbers throughout the six figures, FIG. 1 shows a potted fresh flower arrangement made according to the teachings of the prior art. The arrangement comprises a receptacle 3, generally of metal, plastic or other water-tight material, for holding the stems of flowers set in a fanciful arrangement. Receptacle 3 includes a base 5, usually flat, for setting on a display surface, side walls 7 extending upward therefrom terminating in an opening or mouth 9 formed at top thereof. A sheet of paper 11, either clear or colored, such as green, is sometimes provided and placed about the inside of receptacle 3 to cover base 5 and side walls 7 to keep water inside the receptacle from chemically interacting with the material making up receptacle 3. Sheet 11 is not shown in FIGS. 3 and 5 for clarity. A block or plug 13 of water-saturated "Oasis®" brand foam is placed inside receptacle 3 and the flowers arranged therein.

FIGS. 2 through 5 show the novel method of this invention using the same receptacle 3 as in the prior art. The method of this invention begins with the steps of providing open-top receptacle 3 to hold the flowers set in an arrangement. While not mandatory, this may be followed by the additional step of lining the inside of receptacle 3 with a layer of paper 11 or other water barrier for the reason explained earlier. A measured quantity of foam liquid ingredients 14 is charged into receptacle 3 so that a small-cell foam 15 is rapidly developed that fills substantially the entire volume of at least a significant portion of receptacle 3. Foam 15 is preferred to be a product of a polyester polyol and an isocyanate that, when mixed in the presence of a diamine catalyst, produces a foam of varying pore size and density. By closely controlling the individual ingredients and adding certain other chemicals to the formulation, the finished foam may be flexible, semi-rigid or rigid, and non-reticulated, i.e., where the cells in the foam retain their individual cell characteristics and do not communicate with adjacent cells, or reticulated where each cell opens into the adjacent cell. It is the semi-rigid, reticulated foam that is desired so that the foam supports the stems 19 of the flowers and the water may permeate or pass through the entire foam structure to water the flowers.

Figure 2:
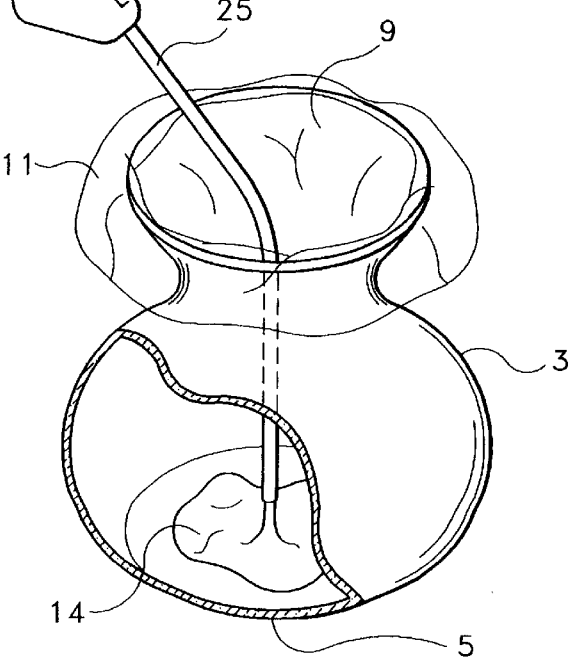
FIG. 2 is a perspective view, partially in section, of the first steps in the novel method of this invention.

Foam liquid ingredients 14 are normally contained in barrels or pots (not shown) and transferred by flexible hoses 21 to the charging site. They are usually mixed in a nozzle 25, as shown in FIG. 2, that is controlled by a charging valve 26 having a depressible charging button 27. Care is taken to control the formulation and size of the liquid charge to rapidly create a foam of a size that does not overflow receptacle 3.

Next, as shown in FIG. 3, a water injector 29 is provided that generally contains a manifold 31, connected to an incoming pressurized water line 33, and that has a plurality of cannula-like, open-ended injector fingers 37 extending downward therefrom and of a length sufficient for delivering a charge of water from the free ends thereof into the bottom of foam 15. The amount of water injected by injector 29 into foam 15 is controlled by a charging valve 39 having a depressible charging button 41 as shown in FIG. 3.

A novel aspect of this invention is that the water injected as aforesaid, creates individual pockets 43 of water at the bottom of foam 15 as shown in FIG. 4. Over a short period of time following injection of the water, the water will permeate into the cells of foam 15, at the bottom of receptacle 3, thus providing a watering reservoir 45 for aquafying the flowers later placed in the arrangement as shown in FIG. 5. Because foam 15 is semi-rigid, as the water leaves individual pockets 43 and permeates into the surrounding foam, the foam will expand back to its original volume and pockets 43 will all but disappear. This is a significant improvement over the prior art where the entire block of foam is saturated with water. The water above reservoir 45 is not needed, makes the arrangement heavier than required, unnecessarily increases shipping costs, and may spill out of receptacle 3 creating a mess with paper 11 and/or the overlying wrapping of flower arrangement 1.

As shown in FIG. 6, an optional step in this method is to provide a punch 49, that comprises a handle 51 and a lance 53 extending outward therefrom. Punch 49 is used to create passageways in foam 15, by plunging lance 53 down into foam 15 through open top 9, wherein stems 19 of flower arrangement 1 are inserted so that the cut ends of the stems extend down into water reservoir 45.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve substantially the same result are within the scope of this invention.

What is claimed is:

1. A method of aquafying a potted flower arrangement comprising the steps of:
   a) providing an open-top receptacle for holding the stems of flowers set in an arrangement;
   b) charging a measured quantity of foamable liquid ingredients into the receptacle, said quantity being sufficient to generate a foam that will fill at least a portion of the receptacle;
   c) injecting a quantity of water, under pressure, down into the generated foam inside the receptacle; and,
   d) inserting the stems of the flowers making up the arrangement into the foam and down into the injected water contained therein.

2. The method of aquafying a potted flower arrangement of claim 1 wherein said open-top receptacle is otherwise water-tight.

3. The method of aquafying a potted flower arrangement of claim 1 wherein the step of providing an open-top receptacle for holding the stems of flowers set in an arrangement is immediately followed by the step of covering the inside surface of the receptacle with a sheet of paper.

4. The method of aquafying a potted flower arrangement of claim 1 wherein said foam ingredients produce a reticulated foam.

5. The method of aquafying a potted flower arrangement of claim 4 wherein said foam is a polyurethane foam generated in situ in the receptacle.

6. The method of aquafying a potted flower arrangement of claim 1 wherein the step of injecting a quantity of water under pressure into the foam includes the additional steps of:
   a) providing a water-injecting device having a plurality of hollow, injector nozzles extending in a common direction and are arranged to fit through the open top of the receptacle and are of a length sufficient to extend down into the lower part of the foam developed therein;
   b) inserting the nozzles down into the foam toward the bottom of the receptacle; and,
   c) forcing water, under positive pressure, through the nozzles and into the foam.

7. The method of aquafying a potted flower arrangement of claim 1 wherein the step of inserting the stems of flowers into the foam is preceded by the step of forming passageways into the foam, from the top of the foam, toward the bottom of the foam for insertion of the stems of the flowers.

8. The product produced by the process of claim 1.

9. A potted flower arrangement assembly comprising:
   a) an open-top, rigid receptacle, including a flat base, side walls extending upward from said base, a neck area smaller in width than the width of said side walls, said neck extending upward and outward between said side walls to an open mouth at the top thereof, for holding the stems of flowers set in an arrangement;
   b) a measured quantity of foam generated in situ in said receptacle, said foam filling a volume of said receptacle;
   c) a quantity of water located in the bottom of the generated foam inside the receptacle to aquafy the bottom of the stems of the flowers;
   d) the stems of the flowers making up the arrangement extending down into the foam and into the injected water contained in the bottom thereof; and,
   e) a nozzle for delivery of the charge of foamable liquid ingredients into said receptacle, that comprises a charging valve having a depressible charging button.

10. A potted flower arrangement assembly comprising:
   a) an open-top, rigid receptacle, including a flat base, side walls extending upward from said base, a neck area smaller in width than the width of said side walls, said neck extending upward and outward between said side walls to an open mouth at the top thereof, for holding the stems of flowers set in an arrangemnent;
   b) a measured quantity of foam generated in situ in said receptacle, said foam filling a volume of said receptacle;
   c) a quantity of water located in the bottom of the generated foam inside the receptacle to aquafy the bottom of the stems of the flowers;
   d) the stems of the flowers making up the arrangement extending down into the foam and into the injected water contained in the bottom thereof;
   e) a nozzle for delivery of the charge of foamable liquid ingredients into said receptacle, that comprises a charging valve having a depressible charging button; and,
   f) a water injector containing a manifold for connection to an incoming pressurized water line, and a plurality of cannula-like, injector fingers, in spaced-apart arrangement, extending downward therefrom and of a length sufficient for delivering the charge of water from the free ends thereof into the bottom of said foam through said open neck area of said receptacle.

* * * * *